United States Patent Office

2,931,706
Patented Apr. 5, 1960

2,931,706

PREPARATION OF DIBASIC ALUMINUM NITRATE

Alan T. Gresky and Eugene O. Nurmi, Oak Ridge, Douglas L. Foster, Knoxville, and Russell P. Wischow and Jouko E. Savolainen, Oak Ridge, Tenn., assignors to the United States of America as represented by the United States Atomic Energy Commission No Drawing. Application June 21, 1954
Serial No. 438,364

10 Claims. (Cl. 23—102)

This invention relates to the preparation of basic aluminum nitrate isolated from aqueous solution.

The instant application is the parent of a copending joint continuation-in-part application in four of our names, viz, Alan T. Gresky, Eugene O. Nurmi, Douglas L. Foster and Jouko E. Savolainen, Serial Number 764,203, filed Sept. 29, 1958, for "Preparation of Dibasic Aluminum Nitrate."

Heretofore, basic aluminum nitrate has been prepared by adding an alkali such as ammonium hydroxide or sodium hydroxide to a solution of aluminum nitrate. When this is done it is necessary either to separate the additional nitrate salts formed or to tolerate the presence of the foreign ions which are very difficult to separate. In certain chemical systems the ammonium or sodium salts form compounds which precipitate in the process equipment. Furthermore, the addition of the foreign ions increases the volume of solids in solution, and, if the solution is radioactive, makes storage the more difficult.

An object of this invention is to provide an improved method of preparing basic aluminum nitrates featuring isolation from aqueous solution of the resulting nitrates. A somewhat more specific object of the invention is to provide a method for preparing basic aluminum nitrates in which the ratio of the hydroxyl ion to the aluminum ion is at least two. Another object of the invention is to provide a method for purifying basic aluminum nitrates. Still another object is to provide an isolated basic aluminum nitrate having the maximum possible number of hydroxyl ions without becoming insoluble in water. A further object of the invention is to provide a method of dissolving aluminum in an aluminum nitrate solution and isolating the resulting product to form basic aluminum nitrates. Other objects of the invention will appear in the following description.

In one of its aspects the present invention comprises dissolving metallic aluminum in aqueous aluminum nitrate in the presence of a small amount of mercury as a catalyst to reduce the ratio of aluminum to nitrate ion to a value in the range of 1 to 1.2 and thereafter adding the resulting solution to a large excess of a solvent consisting essentially of a mono-hydroxy, water-soluble alcohol of from one to four carbon atoms and a low-molecular-weight aliphatic ether at least partially soluble in water to precipitate the basic aluminum nitrate and recovering the precipitated compound.

The solution of metallic aluminum in nitric acid proceeds only with difficulty. The reason for the difficulty, we believe, is that nitric acid tends to form a passive layer on the surface of the aluminum, and the passive layer tends to prevent further reaction. Naturally, it is still more difficult to dissolve excess aluminum in the solution to form the basic nitrate although this is the most desirable method of preparing basic aluminum nitrate from the standpoint of purity of product.

However, in the presence of a small amount of mercury as a catalyst, it has been found in accordance with hereinbefore-cited co-pending continuation-in-part application Serial Number 764,203, that substantial quantities of aluminum may be dissolved in aqueous nitric acid or in an aqueous solution of aluminum nitrate to form basic aluminum nitrate containing two and even more hydroxyl ions for every aluminum ion. In fact, mercury is such an active catalyst for the reaction that the aluminum, although in metallic form, may completely neutralize the nitrate ion and precipitate as aluminum hydroxide. To avoid the formation of water-insoluble compounds, the addition of aluminum should be halted as soon as the ratio of aluminum ion to residual nitrate ion reaches a value of 1.2. At this value, a new compound with the approximate formula $Al_6(OH)_{13}(NO_3)_5$ is produced. In solid form the compound has 8 molecules of water of hydration. This, we have found, is the maximum ratio of hydroxyl to aluminum ion that a water-soluble basic aluminum nitrate may have. Indeed, it is surprising that this compound is soluble in water.

Concentrated solutions of basic aluminum nitrate in which the nitrate-to-aluminum ion ratio is one or more are excessively viscous and difficult to handle. Furthermore, upon standing they form gels. Accordingly, it is desirable to store the compound in solid form.

We have discovered in particular accordance with the present invention that when a concentrated solution of basic aluminum nitrate whose aluminum-to-nitrate ion ratio is one or more is added to a large excess of certain organic solvents, the basic aluminum nitrate precipitates as a pure compound. For this purpose, we use a solvent consisting essentially of a mono-hydroxy, water-soluble alcohol and an aliphatic, low-molecular-weight ether that is at least partially soluble in water. With this solvent, the precipitate is a stable, white, granular solid that is easily handled and stored.

The examples following hereinafter are presented to illustrate the present invention with the understanding that it is not intended to limit the invention to the details disclosed.

*Example 1*

To one liter of neutral, aqueous two-molar aluminum nitrate, $Al(NO_3)_3$, containing 0.005 molar mercuric nitrate, $Hg(NO_3)_2$, there was added 54 grams of aluminum metal (99.6% pure). The reaction mixture was contained in stainless steel vessel provided with a reflux condenser and a system for collecting and/or venting the gases generated in the reaction. The reaction was permitted to proceed for about an hour without external heating and then the mixture was heated to the boiling point to complete the dissolution of the metal. Thereafter, the solution was filtered and analyzed. The gases generated in the reaction were also analyzed. The following equation fits the data obtained from these analyses:

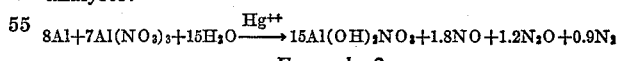

*Example 2*

In a number of experiments a neutral two-molar solution of $Al(NO_3)_3$ that was 0.005 M in mercuric ion was added to a calculated weight of aluminum wire or sheet. The reaction was performed at the boiling point under reflux until the aluminum was consumed.

In these experiments, the solid compound was separated in this way. A solution was evaporated until the concentration of aluminum was approximately 7 molar. After cooling, the concentrated solution was added slowly with stirring to a mixture of methanol and diethyl ether in the ratio of one part of solution to five parts of alcohol to six parts of the ether, all by volume. The resultant precipitate was separated by filtration and partially dried to remove excess water and solvent. Thereafter, the precipitate was washed with ether and then completely dried at a temperature of about 105° C. The separated compound was a white, granular solid which begins to decompose at a temperature of about 140° C.

In the series of similar experiments the composition of this solid lay in the range 19 to 20% aluminum, 26 to 27% OH, 37% $NO_3$ and 16 to 18% $H_2O$, corresponding approximately to the formula $Al_6(OH)_{13}(NO_3)_5 \cdot 8H_2O$. The solid may be pulverized to particles in the range of 400 to 500 microns and may be compacted into pellets, if desired. Upon examination for crystal structure, the compound had none.

After filtration, the solvent was distilled for recovery. In one case, after evaporation to about 2% of the original volume, a viscous yellow liquid remained. After the liquid had been at room temperature for about 18 hours, fine, yellow crystals precipitated. The crystals were collected by centrifugation and analyzed; the analysis showed that the compound was 1.55 molar in aluminum and 3.10 molar in nitrate ion, the proportions of monobasic aluminum nitrate. The alcohol-ether precipitation apparently serves effectively to separate $Al(OH)(NO_3)_2$ from the product $Al(OH)_2NO_3$ or $Al_6(OH)_{13}(NO_3)_5$.

Example 3

An experiment the same as Example 2 was performed except that the metallic aluminum used also contained about 4% copper, 0.5% magnesium and 0.5% manganese as impurities. At the conclusion of the reaction, the reaction mixture had a yellow color. However, after the product had been precipitated by means of the methanol-diethyl ether solvent, the yellow color remained in the supernate. The product was the same white granular solid, and this, upon analysis, was free of the metallic impurities.

The concentration of the mercury catalyst relative to the aluminum metal is dependent to a large extent upon the physical nature of the metallic aluminum, that is, on the surface area exposed to the reactant solution and on the prior metallurgical treatment of the aluminum. The most difficult to dissolve is cast aluminum with extruded and hot- or cold-worked metal following in that order. In general, approximately 1% mercury based on the weight of aluminum will be satisfactory in most instances, although the relative concentration may vary widely. With a four-molar aluminum nitrate solution, a concentration of mercury in the range of 0.001 to one molar may be used. That is to say that the molar ratio of aluminum to mercury should be in the range of 4 to 4,000. The mercury catalyst may be used as the metal with the aluminum in contact with it, for example by amalgamation, or the mercury may be dissolved in the solution as a salt such as mercuric nitrate. The latter is preferred.

While the reaction may be performed at room temperature, it is preferably performed at the boiling point of the solution to take advantage of the increased rate of dissolution at the boiling point.

Other solvents may also be used to separate the aluminum nitrate having a molar ratio of hydroxyl ion to aluminum of at least two. For example, when one part by volume of a concentrated solution of dibasic aluminum nitrate was added to 15 parts by volume of acetone, the compound precipitated as a sort of sticky, viscous syrup. The separated compound, now wet mainly with solvent, was dried and when dried it resembled powdered glass. While considerable amounts of acetone are required for this purpose, the acetone is easily recovered by distilling the supernatant liquid. However, the syrupy form of the precipitate is still inconvenient, and it is necessary to use the alcohol-ether mixture to obtain the granular solid. For this purpose the mono-hydroxy alcohol must be water soluble and alcohols of one to four carbon atoms are preferred. The function of the alcohol, we believe, is to dissolve the water associated with the reaction. The ether should be a relatively low-molecular-weight aliphatic compound that is at least partially soluble in water; diethyl ether is preferred. Its function does not seem explicable from theoretical considerations.

Instead of starting with aqueous aluminum nitrate, an excess of metallic aluminum over that required to form $Al(NO_3)_3$ may be dissolved in nitric acid in the presence of a small quantity of mercury as a catalyst. In this case, $Al(NO_3)_3$ is probably formed initially and reacts with the additional aluminum metal to produce the basic aluminum nitrate. In this case too, the reaction must be halted before the ratio of aluminum to nitrate ion exceeds 1.2, else water-insoluble compounds are formed. The reaction may be performed continuously by flowing the nitric acid over the metallic aluminum. Again the mercury catalyst may be dissolved in the acid as a salt or metallic mercury may be used in direct contact with the aluminum. The former is preferred. By controlling the initial concentration of the nitric acid and its rate of flow, the quantity of aluminum metal relative to the acid and the time of contact, a variety of basic aluminum compounds may be obtained. The following equations exemplify the products that may be obtained by varying these conditions:

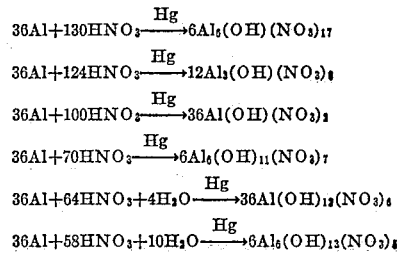

The equations have been converted to a single quantity of aluminum to show the relative amounts of nitric acid consumed to produce the various compounds. In all of these reactions, various quantities of nitrogenous gases such as NO, $N_2O$ and $N_2$ are produced.

Other alternatives will be apparent to those skilled in the art.

Since many embodiments might be made of the present invention and since many changes might be made in the embodiment described, it is to be understood that the foregoing description is to be interpreted as illustrative only and not in a limiting sense.

With respect to uses and applications, known in the art, of basic aluminum nitrates, cross-reference is made to U.S. Patent No. 2,127,504, issued August 23, 1938, in the names of Ralph B. Derr and Henry B. Stere, for Alumina Production, especially page 3, column 1, lines 11–36.

What is claimed is:

1. A method of preparing the compound $$Al_6(OH)_{13}(NO_3)_5$$

in its aqueous solution form at least initially, comprising dissolving a quantity of metallic aluminum in aqueous $Al(NO_3)_3$ to leave a solution in which the ratio of nitrate ion to aluminum ion is 5:6, the aluminum being in contact with a small amount of mercury as a catalyst, thereafter adding the solution to a large excess of a solvent consisting essentially of a mono-hydroxy, water-soluble alcohol of from one to four carbon atoms and a low-molecular-weight aliphatic ether at least partially soluble in water to precipitate the basic aluminum nitrate and recovering the precipitated compound.

2. A method of preparing a water-soluble basic aluminum nitrate in which the ratio of hydroxyl ion to aluminum ion is at least two, comprising dissolving a quantity of metallic aluminum in aqueous $Al(NO_3)_3$ to increase the ratio of aluminum ion to nitrate ion into the range of 1 to 1.2, the aluminum being in contact with a small quantity of mercury as a catalyst, thereafter adding the solution to a large excess of a solvent consisting essentially of a mono-hydroxy, water-soluble alcohol of one to four carbon atoms and a low-molecular-weight aliphatic ether at least partially soluble in water to precipitate the basic aluminum nitrate and recovering the precipitated compound.

3. The method of claim 2 in which the alcohol is methanol and in which the mercury is present as a soluble mercuric salt.

4. The method of claim 2 in which the ether is diethyl ether and in which the mercury is present as a soluble mercuric salt.

5. In the method of preparing a water-soluble basic aluminum nitrate, the steps of separating a water-soluble basic aluminum nitrate from an aqueous solution thereof comprising adding said solution at a concentration of about seven molar to a large excess of an organic solvent consisting essentially of a mono-hydroxy, water-soluble alcohol of one to four carbon atoms and a low-molecular-weight aliphatic ether at least partially soluble in water to precipitate said nitrate and recovering the precipitated nitrate.

6. The method of claim 5 in which the alcohol is methanol and in which the ether is diethyl ether.

7. The method of claim 2 wherein said dissolving is effected at the boiling point of said aqueous $Al(NO_3)_3$, wherein said mercury is present as aqueous mercuric nitrate in quantity such that the molar ratio of aluminum to mercury is in the range of 4 to 4,000, and wherein said adding of solution to solvent is effected by adding one part by volume of the solution to a solvent consisting essentially of five parts by volume of methanol and six parts by volume of diethyl ether.

8. A method of preparing a water-soluble basic aluminum nitrate in which the ratio of hydroxyl ion to aluminum ion is at least two, comprising dissolving a quantity of metallic aluminum into an aqueous solvent selected from the group consisting of aqueous $Al(NO_3)_3$ and aqueous nitric acid to increase the ratio of aluminum ion to nitrate ion to the range 1 to 1.2, the aluminum being in contact with a small quantity of mercury as a catalyst, thereafter adding the resulting solution to a large excess of a solvent consisting essentially of a mono-hydroxy, water-soluble alcohol of one to four carbon atoms and a low-molecular-weight aliphatic ether at least partially soluble in water to precipitate the basic aluminum nitrate and recovering the precipitated compound.

9. The method of claim 8 wherein said aqueous solvent is aqueous nitric acid.

10. In the method of preparing a water-soluble basic aluminum nitrate in which the ratio of hydroxyl ion to aluminum ion is at least two comprising dissolving a quantity of metallic aluminum in aqueous $Al(NO_3)_3$ to increase the ratio of aluminum ion to nitrate ion into the range of 1 to 1.2, the aluminum being in contact with a small quantity of mercury as a catalyst, the step of separating a water-soluble basic aluminum nitrate from the resulting aqueous solution thereof which comprises adding said resulting solution at a concentration of about 7 molar to a large excess of an organic solvent consisting essentially of a mono-hydroxy, water-soluble alcohol of one to four carbon atoms and a low-molecular-weight aliphatic ether at least partially soluble in water to precipitate said nitrate and recovering the precipitated compound.

References Cited in the file of this patent

UNITED STATES PATENTS

| | | |
|---|---|---|
| 2,127,504 | Derr et al. | Aug. 23, 1938 |
| 2,746,842 | Bloch et al. | May 22, 1956 |
| 2,787,522 | Lefrancois | Apr. 2, 1957 |

OTHER REFERENCES

Mellor: "Comprehensive Treatise on Inorganic and Theoretical Chemistry" (1924), vol. 5, pp. 359–361.